United States Patent Office 3,466,298
Patented Sept. 9, 1969

3,466,298
PROCESS FOR THE PREPARATION OF
2-(2-AMINOETHYL)ISOINDOLINES
Theodore S. Sulkowski, Narberth, and Albert A. Mascitti,
Norristown, Pa., assignors to American Home Products
Corporation, New York, N.Y., a corporation of
Delaware
No Drawing. Filed Mar. 14, 1967, Ser. No. 622,928
Int. Cl. C07d 27/48
U.S. Cl. 260—326.1         7 Claims

ABSTRACT OF THE DISCLOSURE

This invention is concerned with a process for the preparation of 2-(2-aminoethyl)isoindolines which are pharmacologically efficacious as antidepressants and anorexiants. This process involves the substitution of a 2-(2-aminoethyl)-3-hydroxyphthalimidine with a halogen to afford a 2-(2-aminoethyl)-3-halophthalimidine which by a displacement reaction is converted to a 3-alkoxy-2-(2-aminoethyl)phthalimidine which is then subjected to hydrogenolysis to yield a 2-(2-aminoethyl)isoindoline.

---

This invention relates to a new and novel process for the preparation of 2-(2-aminoethyl)isoindolines which are known to possess pharmacological activity and are useful as antidepressants and anorexiants.

The new and novel process of the present invention is exemplified by the following reaction scheme:

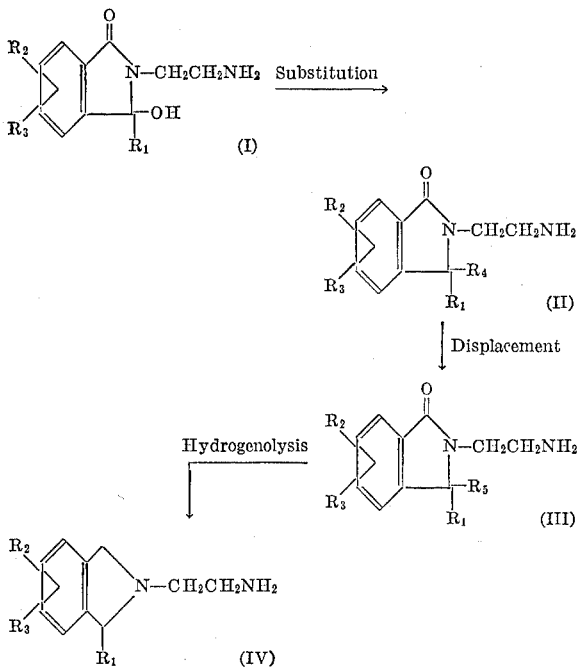

wherein $R_1$ is selected from the group consisting of hydrogen, lower alkyl, phenyl, phen(lower)alkyl, monohalophenyl, dihalophenyl, mono(lower)alkylphenyl, di-(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, amino, lower alkylamino, halogen, lower alkyl and lower alkoxy; $R_3$ is hydrogen when $R_2$ and $R_3$ are dissimilar and when $R_2$ and $R_3$ are the same they are both selected from the group consisting of hydrogen, halogen, lower alkyl and lower alkoxy; $R_4$ is selected from the group consisting of chloro and bromo; and $R_5$ is lower alkoxy. Typical compounds prepared by this process are 2-(2-aminoethyl)-1-(4-chlorophenyl)isoindoline hydrochloride; 2-(2-aminoethyl)-1-(3,4-dichlorophenyl)isoindoline and 2-(2-aminoethyl)-1-phenylisoindoline hydrochloride.

The substitution reaction is effected by contacting a 2-(2-aminoethyl)-3-hydroxyphthalimidine (I) with a halogenating reagent at a temperature range from about 25° C. to about 50° C. for a period of about one-half hour to about three hours. Preferably this reaction is conducted with thionyl chloride at the reflux temperature of the reaction mixture for about one hour. When the substitution reaction is complete, the 2-(2-aminoethyl)-3-halophthalimidine (II) may be separated by conventional recovery procedures, e.g. concentration and recrystallization. Alternatively, the 2-(2-aminoethyl)-3-halophthalimidine (II) may be merely isolated by concentration and then used directly in the following reaction.

The displacement reaction is conducted by dissolving the above prepared 2-(2-aminoethyl)-3-halophthalimidine (II) in an alkanol and heating the resulting mixture at a temperature range from about 25° C. to about 80° C. for a period of about one-half hour to about three hours. Preferably this reaction is conducted in ethanol at the reflux temperature of the reaction mixture for a period of about one hour. When the displacement reaction is complete, the resulting 3-alkoxy-2-(2-aminoethyl)phthalimidine (III) is obtained by standard recovery means, such as, concentration; reconstitution in a mixture of a water immiscible solvent and an alkali metal hydroxide, carbonate or bicarbonate solution, e.g. ethyl acetate-aqueous sodium carbonate solution, toluene- aqueous sodium hydroxide; and reconcentration.

The hydrogenolysis of the above prepared 3-alkoxy-2-(2-aminoethyl) phthalimidine (III) is accomplished by contact with lithium aluminum hydride in an anhydrous reaction-inert organic solvent, at a temperature range of about 35° C. to about 110° C. for a period of about two to twenty hours. Preferably this reaction is conducted in ether at about the reflux temperature of the reaction mixture for a period of about seventeen hours.

When the hydrogenolysis reaction is complete, the product is recovered by procedures well known in the art, for example, the excess lithium aluminum hydride is decomposed by the addition of water, the organic layer is separated, dried over a desiccant and then evaporated to dryness to afford a 2-(2-aminoethyl)isoindoline (IV).

Since many of the compounds prepared by the process of the present invention are basic, advantage may be taken of the water solubility of salts of these compounds formed with acids in the isolation and/or purification of the above compounds and in the preparation of aqueous solutions of these compounds for oral parenteral administration. Of course, only salts formed with pharmaceutically acceptable acids should be employed in therapeutic applications. Particularly effective salts are those formed with pharmaceutically acceptable acids having a pK value of 3 or lower. Such acids are well known in the art, for example, hydrochloric, hydrobromic, sulfuric, nitric, phosphoric, benzenesulfonic, toluenesulfonic, methanesulfonic, ethanesulfonic acids and the like. These salts may be prepared by procedures commonly employed in the art, for example, reacting the compounds with an equivalent of the selected acid in aqueous solution and concentration of the solution. Other known procedures may also be employed.

The time and temperature ranges employed in the aforesaid reactions are not critical but simply represent the most convenient range consistent with carrying out these reactions in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By the term "halogenating reagent" as employed herein is meant a reagent capable of replacing the 3-hydroxy moiety of a 2-(2-aminoethyl)-3-hydroxyphthalimidine with a chlorine or bromine atom, examples of such reagents are: phosphorus trichloride, phosphorus tribromide, phosphorus pentachloride and thionyl chloride. When the substitution reaction is conducted with a non-liquid halogenating reagent, such as phosphorus pentachloride, a solvent, e.g. benzene, should be employed to dissolve the reactants. The term "anhydrous reaction-inert organic solvent" includes any water-free organic solvent which will dissolve the 3-alkoxy-2-(2-aminoethyl)phthalimidine (III) but will not interfere with the hydride reduction thereof. Many such solvents are well known to those skilled in the art of organic chemistry, examples are: ethyl ether, diisopropyl ether, tetrahydrofuran, dioxan, diethylene glycol dimethyl and ether and ethylene glycol dimethyl ether.

The 2-(2-aminoethyl)-3-hydroxyphthalimidines which are used as starting materials in the process of the present invention are known compounds which may be prepared by procedures well known in the art, for example, the condensation of an acid chloride of a benzoyl benzoic acid with an ethylene diamine in pyridine. Alternatively, the 2-(2-aminoethyl)-3-hydroxyphthalimidines are also prepared by the procedure disclosed and claimed in copending and cofiled U.S. patent application, Ser. No. 622,918, entitled "Tetrahydropyrimidinyl Phenyl Carbonyl and Imidazolinyl Phenyl Carbonyl Compounds" which is a continuation-in-part application of United States patent application, Ser. No. 576,833, filed on Sept. 2, 1966, and now abandoned.

The new and novel process of the present invention is utilized to prepare 2-(2-aminoethyl)isoindolines (IV) which are known to possess pharmacological activity and are useful as antidepressants and anorexiants. These 2-(2-aminoethyl)isoindolines are described and claimed in U.S. patent application Ser. No. 622,917, filed on Mar. 14, 1967, entitled "Isoindoles, Isoindolines and Related Compound" which is also a continuation-in-part application of the above U.S. patent application, Ser. No. 576,833, filed on Sept. 2, 1966, and now abandoned.

The following examples are given by way of illustration.

EXAMPLE I

Twenty grams of 2-(2-aminoethyl)-3-(4-chlorophenyl)-3-hydroxyphthalimidine hydrochloride and 25 ml. of thionyl chloride are refluxed for one hour. The mixture is evaporated to dryness and the residue admixed with absolute ethanol (50 ml.) which is then refluxed one hour. Thereafter, the mixture is evaporated to dryness and the residue is shaken with an ethyl acetate and sodium carbonate solution. The ethyl acetate layer is dried over magnesium sulfate, then evaporated to dryness to afford 2 - (2 - aminoethyl) - 3-(4-chlorophenyl)-3-ethoxyphthalimidine, M.P. 118–120° C.

Thirteen grams of the above prepared phthalimidine are added in portions to a stirred suspension of 2.5 g. of lithium aluminum hydride in 350 ml. of anhydrous ether. After refluxing for seventeen hours, the mixture is decomposed by careful addition of water. The ether layer is dried over magnesium sulfate, then saturated with anhydrous hydrogen chloride and the resulting solid is separated and recrystallized from ethanol-ether. On drying there is obtained 2-(2-aminoethyl)-1-(4-chlorophenyl)isoindoline hydrochloride, M.P. 220–223° C.

*Analysis.*—for $C_{16}H_{17}N_2Cl$. Calc'd: C, 62.15; H, 5.87; N, 9.06; Cl, 22.93. Found: C, 61.76; H, 6.09; N, 9.44; Cl, 22.70.

In a similar manner, the above substitution reaction is conducted with phosphorus pentachloride in ether.

EXAMPLE II

Forty grams of 2-(2-aminoethyl)-3-hydroxy-3-phenylphthalimidine hydrochloride and 50 ml. of thionyl chloride are refluxed for two hours. The mixture is evaporated to dryness, admixed with absolute ethanol (100 ml.) and refluxed for two hours. Subsequently, the mixture is evaporated to dryness and the residue shaken with ethyl acetate and sodium bicarbonate solution. The ethyl acetate layer is dried over magnesium sulfate then evaporated to dryness to obtain 2-(2-aminoethyl)-3-ethoxy-3-phenylphthalimidine.

Twenty-six grams of the above phthalimidine are added in portions to a stirred suspension of 5.0 g. of lithium aluminum hydride in 700 ml. of anhydrous ether. After refluxing for ten hours, the mixture is decomposed by careful addition of water. The ether layer is dried over magnesium sulfate and then saturated with anhydrous hydrogen chloride. The solid is separated, recrystallized from ethanolether and dried to afford 2-(2-aminoethyl)-1-phenylisoindoline hydrochloride.

EXAMPLE III

Ten grams of 2-(2-aminoethyl)-6-bromo-3-hydroxy-3-(4-tolyl)phthalimidine and 12.5 ml. of thionyl chloride are stirred at 25° C. for two hours. Thereafter, the reaction mixture is evaporated to dryness to afford 2-(2-aminoethyl)-6-bromo-3-chloro-3-(4-tolyl)phthalimidine.

The above prepared 2-(2-aminoethyl)-6-bromo-3-chloro-3-(4-tolyl)phthalimidine is admixed with methanol (25 ml.) and stirred at room temperature for two hours. Subsequently, the reaction mixture is evaporated to dryness and the residue shaken with a mixture of ether and aqueous sodium hydroxide. The organic layer is dried over magnesium sulfate and then evaporated to dryness to yield 2-(2-aminoethyl)-6-bromo-3-methoxy-3-(4-tolyl)phthalimidine.

The above prepared 2-(2-aminoethyl)-6-bromo-3-methoxy-3-(4-tolyl)phthalimidine (6 g.) is added in portions to a stirred suspension of 1.5 g. of lithium aluminum hydride in 175 ml. of anhydrous dioxan. After heating the resulting mixture for fifteen hours at 50° C., the mixture is decomposed by careful addition of water. The organic layer is dried over magnesium sulfate and evaporated to dryness to afford 2-(2-aminoethyl)-5-bromo-1-(4-tolyl)isoindoline.

The above process is repeated starting with 2-(2-aminoethyl)-3-hydroxy-5-methyl-3-propylphthalimidine to afford 2-(2-aminoethyl)-6-methyl-1-propylisoindoline.

EXAMPLE IV

Five grams of 2-(2 aminoethyl)-5,6-dibromo-3-(4-bromophenyl)-3-hydroxyphthalimidine and 7 ml. of phosphorus tribromide are heated to 50° C. for one-half hour. Thereafter, the reaction mixture is evaporated to dryness to afford 2-(2-aminoethyl)-3,5,6-tribromo-3-(4-bromophenyl)phthalimidine.

The above prepared phthalimidine is admixed with propanol (25 ml.) and the mixture is refluxed for one-half hour. Subsequently, the reaction mixture is evaporated to dryness and the residue shaken with ether and aqueous potassium carbonate. The organic layer is dried over magnesium sulfate and then evaporated to dryness to yield 2-(2-aminoethyl)-5,6-dibromo-3-(4-bromophenyl)-3-propoxy-phthalimidine.

The above prepared phthalimidine (2 g.) is added in portions to a stirred suspension of 0.5 g. of lithium aluminum hydride in 60 ml. of anhydrous tetrahydrofuran. After heating the resulting mixture at reflux temperatures for twenty hours, the mixture is decomposed by careful addition of water. The organic layer is dried over magnesium sulfate and evaporated to dryness to afford 2-(2-aminoethyl)-5,6-dibromo-1-(4-bromophenyl)isoindoline.

In a similar manner, the above procedure is repeated to afford 2-(2-aminoethyl)-7-iodoisoindoline and 2-(2-aminoethyl)-1-(3,4-dichlorophenyl)isoindoline.

EXAMPLE V

Twenty grams of 2-(2-aminoethyl-3-(3,4-dichlorophenyl)-3-hydroxyphthalimidine and 25 ml. of thionyl chloride are refluxed for one hour. Thereafter, the reaction mixture is evaporated to dryness to afford 2-(2-aminoethyl)-3-chloro-3-(3,4-dichlorophenyl)phthalimidine.

The above prepared 2-(2-aminoethyl)-3-chloro-3-(3,4-dichlorophenyl)phthalimidine is admixed with ethanol (50 ml.) and the mixture heated to the reflux temperature of the reaction mixture for one hour. Subsequently, the reaction mixture is evaporated to dryness and the residue shaken with ethyl acetate and aqueous sodium carbonate. The organic layer is dried over magnesium sulfate and then evaporated to dryness to yield 2-(2-aminoethyl)-3-(3,4-dichlorophenyl)-3-ethoxyphthalimidine.

The above prepared phthalimidine (12 g.) is added in portions to a stirred suspension of 2.5 g. of lithium aluminum hydride in 350 ml. of anhydrous ether. After refluxing the resulting mixture for ten hours, the mixture is decomposed by careful addition of water. The organic layer is dried over magnesium sulfate and evaporated to dryness to afford 2-(2-aminoethyl)-1-(3,4-dichlorophenyl)isoindoline.

The above substitution reaction to convert 2-(2-aminoethyl)-3-(3,4-dichlorophenyl)-3-hydroxyphthalimidine to the corresponding 3-chloro compound, is repeated utilizing phosphorus trichloride as the halogenating reagent.

EXAMPLE VI

Repeating the procedure of Examples I to V, the following 2-(2-aminoethyl)-3-hydroxyphthalimidines are converted to the hereinafter listed 2-(2-aminoethyl)isoindolines:

| Starting material | Product |
|---|---|
| 2-(2-aminoethyl)-3-(4-trifluoromethylphenyl)-3-hydroxyphthalimidine | 2-(2-aminoethyl)-1-(4-trifluoromethylphenyl)isoindoline. |
| 2-(2-aminoethyl)-3-(4-bromophenyl)-3-hydroxyphthalimidine | 2-(2-aminoethyl)-1-(4-bromophenyl)isoindoline. |
| 2-(2-aminoethyl)-3-hydroxy-3-(5,6,7,8-tetrahydro-2-naphthyl)phthalimidine | 2-(2-aminoethyl)-1-(5,6,7,8-tetrahydro-2-naphthyl)isoindoline. |
| 2-(2-aminoethyl)-3-furyl-3-hydroxyphthalimidine | 2-(2-aminoethyl)-1-furylisoindoline. |
| 2-(2-aminoethyl)-3-benzyl-6-ethyl-3-hydroxyphthalimidine | 2-(2-aminoethyl)-1-benzyl-5-ethylisoindoline. |
| 2-(2-aminoethyl)-3-hydroxy-3-pyridylphthalimidine | 2-(2-aminoethyl)-1-pyridylisoindoline. |
| 2-(2-aminoethyl)-3-hydroxy-3-(2-thienyl)phthalimidine | 2-(2-aminoethyl)-1-(2-thienyl)-isoindoline. |
| 2-(2-aminoethyl)-3-hydroxy-3-(3,4-dimethoxyphenyl)phthalimidine | 2-(2-aminoethyl)-1-(3,4-dimethoxyphenyl)isoindoline. |

EXAMPLE VII

Forty grams of 2-(2-aminoethyl)-6-chloro-3-hydroxy-3-phenylphthalimidine and 25 ml. of thionylchloride are heated to 35° C. for one hour. Thereafter, the reaction mixture is evaporated to dryness to afford 2-(2-aminoethyl)-3,6-dichloro-3-phenylphthalimidine.

The above prepared 2-(2-aminoethyl)-3,6-dichloro-3-phenylphthalimidine is admixed with butanol (25 ml.) and the mixture is refluxed for one hour. Subsequently, the reaction mixture is evaporated to dryness and the residue shaken with toluene and aqueous potassium carbonate. The organic layer is dried over magnesium sulfate and then evaporated to dryness to yield 2-(2-aminoethyl)-3-butoxy-6-chloro-3-phenylphthalimidine.

The above prepared phthalimidine (25 g.) is added in portions to a stirred suspension of 5 g. lithium aluminum hydride in 700 ml. of anhydrous diethylene glycol dimethyl ether. After heating the resulting mixture for twenty hours at 35° C., the mixture is decomposed by careful addition of water. The organic layer is dried over magnesium sulfate and evaporated to dryness to afford 2-(2-aminoethyl)-5-chloro-1-phenylisoindoline.

In the same manner, 2-(2-aminoethyl)-3-hydroxy-5-methyl-3-phenethylphthalimidine is converted to 2-(2-aminoethyl)-6-methyl-1-phenethylisoindoline.

EXAMPLE VIII

Ten grams of 2-(2-aminoethyl)-6-ethylamino-3-hydroxy-3-phenylphthalimidine and 12.5 ml. of thionyl chloride are heated to reflux temperatures for one hour. Thereafter, the reaction mixture is evaporated to dryness to afford 2-(2-aminoethyl)-3-chloro-6-ethylamino-3-phenylphthalimidine.

The above prepared phthalimidine is admixed with ethanol (25 ml.) and the mixture heated to reflux temperature for one hour. Subsequently, the reaction mixture is evaporated to dryness and the residue shaken with ethyl acetate and aqueous sodium bicarbonate. The organic layer is dried over magnesium sulfate and then evaporated to dryness to yield 2-(2-aminoethyl)-3-ethoxy-6-ethylamino-3-phenylphthalimidine.

The above prepared phthalimidine (10 g.) is added in portions to a stirred suspension of 2.5 g. of lithium aluminum hydride in 400 ml. of anhydrous ethyl ether. After heating the resulting mixture at reflux temperatures for ten hours the mixture is decomposed by careful addition of water. The organic layer is dried over magnesium sulfate and evaporated to dryness to afford 2-(2-aminoethyl)-5-ethylamino-1-phenylisoindoline.

In the same manner, the following compounds are prepared:
5-amino-2-(2-aminoethyl)-1-phenylisoindoline;
2-(2-aminoethyl)-5,6-dichloro-1-phenylisoindoline; and
2-(2-aminoethyl)-5,6-dimethoxy-1-phenylisoindoline.

EXAMPLE IX

The hydrochloride salts of the 2-(2-aminoethyl) isoindolines of this invention are prepared by admixing the particular 2-(2-aminoethyl)isoindoline in an ethanol-ether solution of hydrogen chloride and, thereafter, separating the resulting hydrochloride salt.

Other acid addition salts of the 2-(2-aminoethyl) isoindolines described in the above examples are prepared by similar procedures employing hydrobromic acid, hydroiodic acid, phosphoric acid, tartaric acid, acetic acid, succinic acid, maleic acid and gluconic acid.

What is claimed is:

1. A process for the production of compounds having the formula:

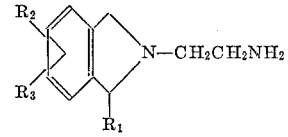

wherein $R_1$ is selected from the group consisting of hydrogen, lower alkyl, phenyl, phen(lower)alkyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, halogen, amino, lower alkylamino, lower alkyl and lower alkoxy; and $R_3$ is hydrogen when $R_2$ and $R_3$ are dissimilar and when $R_2$ and $R_3$ are the same they are both selected from the group consisting of hydrogen, halogen, lower alkyl and lower alkoxy; which comprises reacting a 3-alkoxy-2-(2-aminoethyl)phthalimidine of the formula:

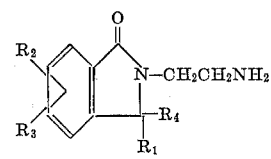

wherein $R_1$, $R_2$ and $R_3$ are defined as above and $R_4$ is lower alkoxy, with lithium aluminum hydride in an anhydrous reaction-inert ether solvent at a temperature range from about 35° C. to about 110° C. for a period of about two to about twenty-four hours.

2. A process as described in claim 1 which is conducted in an anhydrous reaction-inert ether solvent which is ethyl ether at about reflux temperature of the reaction mixture for a period of about seventeen hours.

3. A process as described in claim 1 for the production of: 2-(2-aminoethyl)-1-(4-chlorophenyl)isoindoline.

4. A process as described in claim 1 for the production of 2-(2-aminoethyl)-1-(4-chlorophenyl)isoindoline which comprises the hydrogenolysis of 2-(2-aminoethyl)-3-(4-chlorophenyl)-3-ethoxyphthalimidine with lithium aluminum hydride, in ethyl ether at about the reflux temperature of the reaction mixture for about seventeen hours.

5. A process for the production of compounds of the formula:

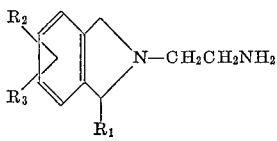

wherein $R_1$ is selected from the group consisting of hydrogen, lower alkyl, phenyl, phen(lower)alkyl, monohalophenyl, dihalophenyl, mono(lower)alkylphenyl, di(lower)alkyphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, halogen, amino, lower alkylamino, lower alkyl and lower alkoxy; and $R_3$ is hydrogen when $R_2$ and $R_3$ are dissimilar and when $R_2$ and $R_3$ are the same they are both selected from the group consisting of hydrogen, halogen, lower alkyl and lower alkoxy; which comprises contacting a 2-(2-aminoethyl)-3-hydroxyphthalimidine of the formula:

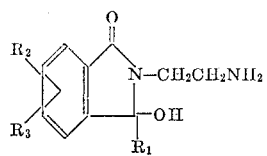

wherein $R_1$, $R_2$, and $R_3$ are defined as above, with a halogenating reagent selected from the group consisting of phosphorous trichloride, phosphorus tribromide, phosphorus pentachloride and thionyl chloride at a temperature range from about 25° C. to about 50° C. for a period of about one-half hour to about three hours, to form a 2-(2-aminoethyl)-3-halophthalimidine of the formula:

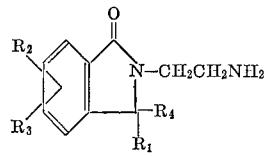

wherein $R_1$, $R_2$ and $R_3$ are defined as above and $R_4$ is selected from the group consisting of chloro and bromo, reacting said 2-(2-aminoethyl)-3-halophthalimidine with a lower alkanol at a temperature range from about 25° C. to about 80° C. for a period of about one-half hour to about three hours, to form a 3-alkoxy-2-(2-aminoethyl)phthalimidine of the formula:

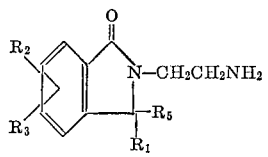

wherein $R_1$, $R_2$, and $R_3$ are defined as above, and $R_5$ is lower alkoxy; and reacting said 3-alkoxy-2-(2-aminoethyl)phthalimidine with lithium aluminum hydride in an anhydrous reaction-inert ether solvent at a temperature range from about 35° C. to about 110° C. for a period of about two to about twenty-four hours.

6. A process as described in claim 5 for the production of: 2-(2-aminoethyl)-1-(4-chlorophenyl)isoindoline.

7. A process as described in claim 5 for the production of 2-(2-aminoethyl)-1-(4-chlorophenyl)isoindoline which comprises:

(a) reacting 2-(2-aminoethyl)-3-(4-chlorophenyl)-3-hydroxyphthalimidine with thionyl chloride at about the reflux temperature of the reaction mixture for a period of about one hour to afford 2-(2-aminoethyl)-3-chloro-3-(4-chlorophenyl)phthalimidine;

(b) reaching said 2-(2-aminoethyl)-3-chloro-3-(4-chlorophenyl)phthalimidine with ethanol at about the reflux temperature of the reaction mixture for about one hour to afford 2-(2-aminoethyl)-3-(4-chlorophenyl)-3-ethoxyphthalimidine; and (c) reacting said 2-(2-aminoethyl)-3-(4-chlorophenyl) 3-ethoxyphthalimidine with lithium aluminum hydried in ethyl ether at about reflux temperature of the reaction mixture for about seventeen hours.

References Cited
UNITED STATES PATENTS 3,334,113   8/1967   Houlihan _____ 260—309.7

ALEX MAZEL, Primary Examiner

J. A. NARCAVAGE, Assistant Examiner

U.S. Cl. X.R.

260—325, 296; 424—274